(12) United States Patent
Eguchi et al.

(10) Patent No.: US 9,200,690 B2
(45) Date of Patent: Dec. 1, 2015

(54) CYLINDRICAL VIBRATION-DAMPING DEVICE

(71) Applicant: TOKAI RUBBER INDUSTRIES, LTD., Komaki-shi, Aichi (JP)

(72) Inventors: Shimpei Eguchi, Konan (JP); Satoshi Umemura, Komaki (JP); Hiroaki Tanahashi, Kitanagoya (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 16 days.

(21) Appl. No.: 14/227,328

(22) Filed: Mar. 27, 2014

(65) Prior Publication Data

US 2014/0210148 A1     Jul. 31, 2014

Related U.S. Application Data

(63) Continuation of application No. PCT/JP2013/005040, filed on Aug. 27, 2013.

(30) Foreign Application Priority Data

Aug. 28, 2012   (JP) .................................. 2012-187263

(51) Int. Cl.
   *F16F 1/38*   (2006.01)
(52) U.S. Cl.
   CPC ............. *F16F 1/3828* (2013.01); *F16F 1/3863* (2013.01)
(58) Field of Classification Search
   CPC ..... F16F 1/3828; F16F 13/14; F16F 13/1409; F16F 1/3863
   USPC ......... 267/141–141.4, 140.11–140.13, 140.3, 267/140.4
   See application file for complete search history.

(56) References Cited

U.S. PATENT DOCUMENTS

| 5,013,012 A | * | 5/1991 | Jouade ..................... 267/140.12 |
| 5,092,565 A | * | 3/1992 | Hamaekers et al. ..... 267/140.12 |
| 7,198,256 B2 | * | 4/2007 | Tatura et al. ............. 267/140.13 |

FOREIGN PATENT DOCUMENTS

| EP | 905405 A1 | * | 3/1999 |
| EP | 2431629 A2 | * | 3/2012 |
| JP | U-59-75954 | | 5/1984 |
| JP | A-02-253024 | | 10/1990 |
| JP | A-2005-330976 | | 12/2005 |
| JP | A-2008-082517 | | 4/2008 |

OTHER PUBLICATIONS

Nov. 26, 2013 International Search Report issued in International Application No. PCT/JP2013/005040 (with translation).

* cited by examiner

*Primary Examiner* — Melanie Torres Williams
(74) *Attorney, Agent, or Firm* — Oliff PLC

(57) ABSTRACT

A cylindrical vibration-damping device wherein an outer cylindrical member is made in a configuration of two sections divided along an circumference, the outer cylindrical member being externally fitted onto intermediate rings in a non-adhesive manner by means of having the intermediate rings sandwiched by the outer cylindrical member in a radial direction, and a plurality of regulating protrusions protruding inward in the radial direction are formed on the outer cylindrical member at a given distance and arranged on both sides of the intermediate rings in an axial direction so as to provide a positioning member that positions the intermediate rings with respect to the outer cylindrical member in the axial direction by means of abutting the intermediate rings against the regulating protrusions in the axial direction.

9 Claims, 10 Drawing Sheets

CYLINDRICAL VIBRATION-DAMPING DEVICE

INCORPORATED BY REFERENCE

The disclosure of Japanese Patent Application No. 2012-187263 filed on Aug. 28, 2012 including the specification, drawings and abstract is incorporated herein by reference in its entirety. This is a Continuation of International Application No. PCT/JP2013/005040 filed on Aug. 27, 2013.

BACKGROUND OF THE INVENTION

1. Field of the Invention

The present invention relates to a cylindrical vibration-damping device to be used, for example, for automobile engine mounts, diff mounts, body mounts, member mounts and the like.

2. Description of the Related Art

Conventionally, as a vibration damping device interposed between the members constituting a vibration transmission system that connects the members to each other in a vibration-damping manner, there has been known a cylindrical vibration-damping device, which is widely used as a diff mount and the like wherein the vehicular body (sub-frame) supports the automotive differential gear in a vibration-damping manner. This cylindrical vibration-damping device has a structure where an inner shaft member and an outer cylindrical member are elastically connected by a main rubber elastic body, and more specifically, as shown in Japanese Unexamined Patent Publication No. JP-A-2005-330976 and others, an inner shaft member provided with a stopper portion protruding in the radial direction and an intermediate ring are elastically connected by a main rubber elastic body, while an outer cylindrical member is externally fitted onto the intermediate ring.

In case of the cylindrical vibration-damping device described in JP-A-2005-330976, the intermediate ring is attached to the outer cylindrical member in a non-adhesive manner. Then, the intermediate ring is prevented from going outward off the outer cylindrical member in the axial direction by having the outer edge of the outer cylindrical member in the axial direction bent toward the inner periphery to overlap with the outer surface of the intermediate ring in the axial direction.

However, in the structure shown in JP-A-2005-330976, relative displacement inward in the axial direction of the intermediate ring with respect to the outer cylindrical member is only limited by the friction resistance and the like acting between the outer peripheral surface of the intermediate ring and the inner peripheral surface of the outer cylindrical member, which is not enough to regulate relative displacement of the intermediate ring with respect to the outer cylindrical member at an input of a large load.

SUMMARY OF THE INVENTION

The present invention has been developed in view of the above-described matters as the background, and it is an object of the present invention to provide a cylindrical vibration-damping device with a novel structure that enables relative positioning between an intermediate ring and an outer cylindrical member in the axial direction in a configuration where the intermediate ring and the outer cylindrical member are attached to each other in a non-adhesive manner.

Specifically, a first aspect of the present invention provides a cylindrical vibration-damping device comprising: an inner shaft member having a stopper portion protruding in an axis-perpendicular direction from a middle portion in an axial direction thereof; a pair of intermediate rings extending in a circumferential direction around the inner shaft member while being arranged respectively on both sides across the stopper portion in the axial direction; a main rubber elastic body elastically connecting the stopper portion and the intermediate rings; and an outer cylindrical member externally fitted onto the intermediate rings, wherein the outer cylindrical member is made in a configuration of two sections divided along an circumference, the outer cylindrical member being externally fitted onto the intermediate rings in a non-adhesive manner by means of having the intermediate rings sandwiched by the outer cylindrical member in a radial direction, and wherein a plurality of regulating protrusions protruding inward in the radial direction are formed on the outer cylindrical member at a given distance and arranged on both sides of the intermediate rings in the axial direction so as to provide a positioning member that positions the intermediate rings with respect to the outer cylindrical member in the axial direction by means of abutting the intermediate rings against the regulating protrusions in the axial direction.

In the cylindrical vibration device with the structure according to the first aspect, the divided two sections of the outer cylindrical member are attached to a pair of intermediate rings in a non-adhesive manner sandwiching them in the radial direction, thus preventing the relative position of the pair of intermediate rings in the axial direction from changing significantly by the installation of the outer cylindrical member.

Also, by having the regulating protrusion formed on the outer cylindrical member arranged on both inside and outside of the intermediate ring in the axial direction, the intermediate ring is positioned on both sides with respect to the outer cylindrical member in the axial direction by abutting against the regulating protrusion. This allows the intermediate ring to be retained in a given condition of assembly with the outer cylindrical member, thus achieving an intended vibration damping performance in a stable manner.

A second aspect of the present invention provides the cylindrical vibration-damping device according to the first aspect, wherein an outer peripheral surface of the intermediate ring is provided with a guiding slope whose diameter decreases outward in the axial direction, while an inner surface in the axial direction of the regulating protrusion located outside the intermediate ring in the axial direction constitutes a holding slope corresponding to the guiding slope.

According to the second aspect, the intermediate ring and the outer cylindrical member are superposed over a broader area in the axial direction to be relatively positioned to each other in an easy and stable manner based on the guiding effects of the abutment between the guiding slope of the intermediate ring and the holding slope of the regulating protrusion. In addition, even in a configuration where the guiding slope and the holding slope inclined against the axial direction are superposed in a non-adhesive manner, the intermediate ring is positioned with respect to the outer cylindrical member in the axial direction by abutting against the regulating protrusion. Thus, the intermediate ring is prevented from being relatively displaced with respect to the outer cylindrical member in the axial direction separating the guiding slope and the holding slope away from each other.

A third aspect of the present invention provides the cylindrical vibration-damping device according to the second aspect, wherein by means of having the pair of intermediate rings sandwiched in the radial direction between the outer cylindrical member divided into two sections in such a way that the guiding slope of each intermediate ring is pressed by the outer cylindrical member, the pair of intermediate rings are displaced closer to each other in the axial direction so as to apply pre-compression to the main rubber elastic body in the axial direction.

According to the third aspect, since forces are applied to the pair of intermediate rings in the direction of getting relatively closer to each other in the axial direction due to the abutment of the outer cylindrical member against the guiding slope in the radial direction causing compressive deformation of the main rubber elastic body, the tensile stress of the main rubber elastic body is reduced, thus achieving better durability thereof. In addition, it requires no special diameter-reducing processing or the like, and since the main rubber elastic body is provided with pre-compression by fitting the outer cylindrical member against the intermediate ring, better manufacturability of the vibration damping device is obtained.

A fourth aspect of the present invention provides the cylindrical vibration-damping device according to any one of the first to third aspects, wherein the plurality of regulating protrusions extend in the circumferential direction and the intermediate rings are fitted in fitting grooves formed between the regulating protrusions in the axial direction.

According to the fourth aspect, since the intermediate ring is abutted against the regulating protrusion continuously along the circumference for a given length, positioning of the intermediate ring with respect to the outer cylindrical member can be performed in a more stable manner. In addition, since the intermediate ring is fitted in the fitting groove formed between the regulating protrusions in the axial direction, the intermediate ring is positioned under a condition where it is barely displaced with respect to the outer cylindrical member in the axial direction, thus achieving stability and the like of the vibration damping performance more effectively.

A fifth aspect of the present invention provides the cylindrical vibration-damping device according to any one of the first to fourth aspects, wherein the intermediate ring is provided with a pair of fixed portions facing each other in one radial direction, and the pair of fixed portions and the stopper portion are elastically connected to each other by the main rubber elastic body, while the intermediate ring is provided with a pair of connecting joints that connect ends of the pair of fixed portions in the circumferential direction, and the regulating protrusions are arranged on both sides of the pair of connecting joints in the axial direction.

According to the fifth aspect, a pair of fixed portions and a pair of connecting joints are provided along the circumference of the intermediate ring, and the intermediate ring and the inner shaft member are elastically connected by the main rubber elastic body at the pair of fixed portions. This arrangement differentiates the spring characteristics in the two axis-perpendicular directions that are approximately perpendicular to each other, thus meeting the characteristic requirements for each direction at a high level. Further, if the pair of connecting joints provided away from the joint portion connected by the main rubber elastic body are positioned in the axial direction by the regulating protrusion, interference with the main rubber elastic body by the regulating protrusion located inward in the axial direction can be avoided so as to increase a degree of freedom for design of the main rubber elastic body, thus favorably achieving the intended vibration damping performance.

A sixth aspect of the present invention provides the cylindrical vibration-damping device according to the fifth aspect, wherein the regulating protrusions are arranged on both sides in the axial direction of the pair of fixed portions as well as on both sides in the axial direction of the pair of connecting joints, while a protrusion height inward in the radial direction of the regulating protrusion arranged inside the pair of fixed portions in the axial direction is made smaller than that of the regulating protrusion arranged inside the pair of connecting joints in the axial direction.

According to the sixth aspect, the positioning of the intermediate ring in the axial direction can be performed by the regulating protrusion all along the circumference. In addition, since the height of the regulating protrusion inward in the radial direction is made different between the abutment portion against the fixed portion and the abutment portion against the connecting joint, the regulating protrusion is prevented from interfering with the main rubber elastic body so that the intended spring characteristics are obtained, while exerting the full effect of positioning in the axial direction by means of keeping the abutting area of the regulating protrusions large enough at the connecting joint.

A seventh aspect of the present invention provides the cylindrical vibration-damping device according to any one of the first to sixth aspects, wherein a window portion is formed penetrating through a portion of the outer cylindrical member opposing the stopper portion in the axis-perpendicular direction.

According to the seventh aspect, the protrusion height of the stopper portion can be made larger by the thickness in the radial direction of the outer cylindrical member while keeping the stopper clearance. Therefore, a larger area of overlap in projection between the stopper portion and the intermediate ring in the axial direction can be obtained, thus allowing the compression spring of the main rubber elastic body to exert more efficiently.

An eighth aspect of the present invention provides the cylindrical vibration-damping device according to any one of the first to seventh aspects, wherein the main rubber elastic body is abutted against the outer cylindrical member inside the intermediate ring in the axial direction in a non-adhesive manner, while the main rubber elastic body is provided continuously in the axis-perpendicular direction between the inner axial member and the outer cylindrical member at a section abutting against the outer cylindrical member.

According to the eighth aspect, the main rubber elastic body is provided continuously in the axis-perpendicular direction inside the intermediate ring in the axial direction between the inner shaft member and the outer cylindrical member. Thus, the inner shaft member and the outer cylindrical member get closer to each other in the axis-perpendicular direction generate compressive deformation of the main rubber elastic body in an efficient manner, thus developing a stiff spring effect by the compression spring. Meanwhile, the continuous portion in the axis-perpendicular direction of the main rubber elastic body is abutted against the outer cylindrical member in a non-adhesive manner. This will reduce the tensile stress acting on the main rubber elastic body by the separation between the inner shaft member and outer cylindrical member from each other in the axis-perpendicular direction, thus achieving better durability of the main rubber elastic body against the input in the axis-perpendicular direction.

A ninth aspect of the present invention provides the cylindrical vibration-damping device according to any one of the first to eighth aspects, wherein an inner peripheral surface of the intermediate ring, where the main rubber elastic body is bonded, constitutes a sloped curvature that is convex in a longitudinal cross section toward the main rubber elastic body.

According to the ninth aspect, a large area of free surface is reserved for the main rubber elastic body, thus favorably maintaining durability thereof, while stiff spring characteristics are achieved by reduced rubber volume of the main rubber elastic body. In summary, effective improvements are achieved both in terms of better vibration damping performance due to the realized stiff spring characteristics and better durability due to the larger free surface of the main rubber elastic body.

According to the present invention, since divided two sections of the outer cylindrical member are attached to the pair of intermediate rings sandwiching them in the radial direction in a non-adhesive manner, positional shifting of the pair of intermediate rings in the axial direction by the installation of the outer cylindrical member is prevented. Also, since the positioning member that determines the relative position of the intermediate ring and the outer cylindrical member in the axial direction is constituted by the abutment of the intermediate ring against the regulating protrusion formed on the outer cylindrical member, positional shifting in the axial direction of the intermediate ring due to load inputs is prevented, thus achieving the intended vibration damping performance in a stable manner.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
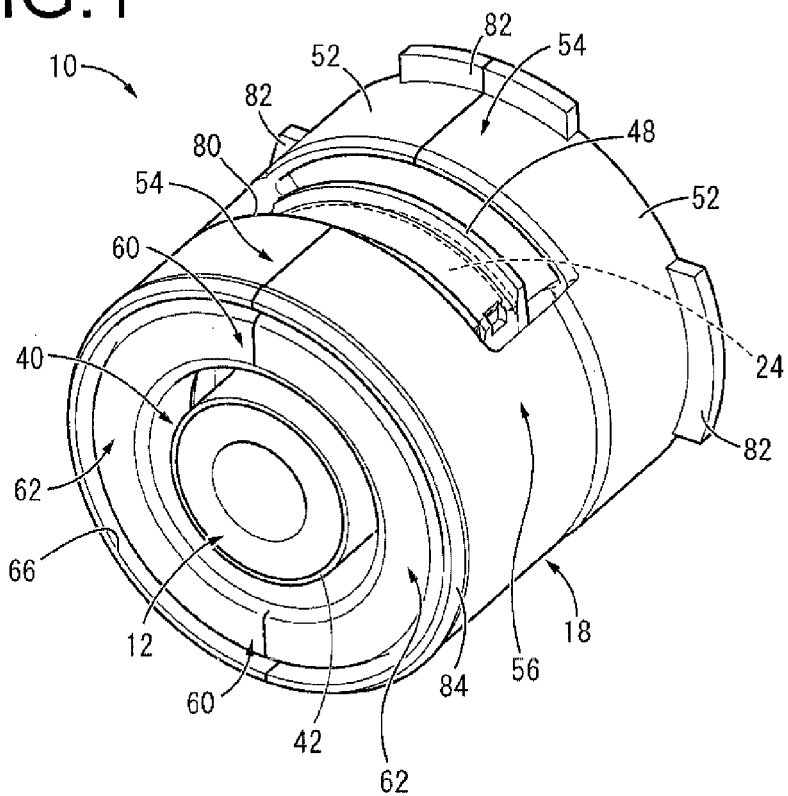
FIG. 1 is a perspective view of a cylindrical vibration-damping device in the form of a diff mount as a first embodiment of the present invention.
Figure 2:
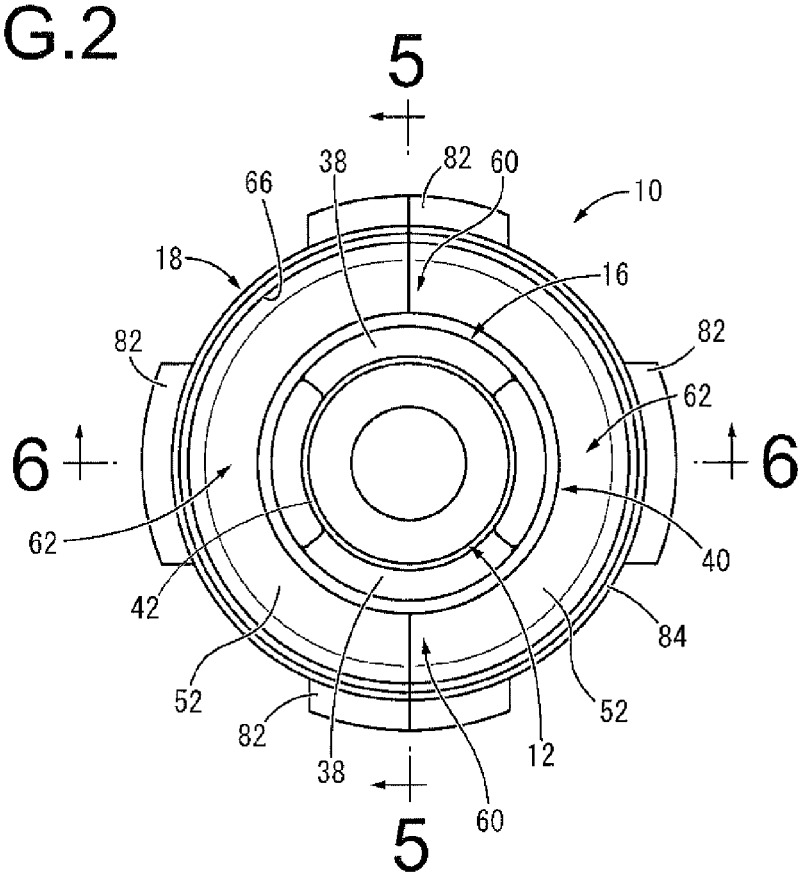
FIG. 2 is a front view of the diff mount shown in FIG. 1.
Figure 3:
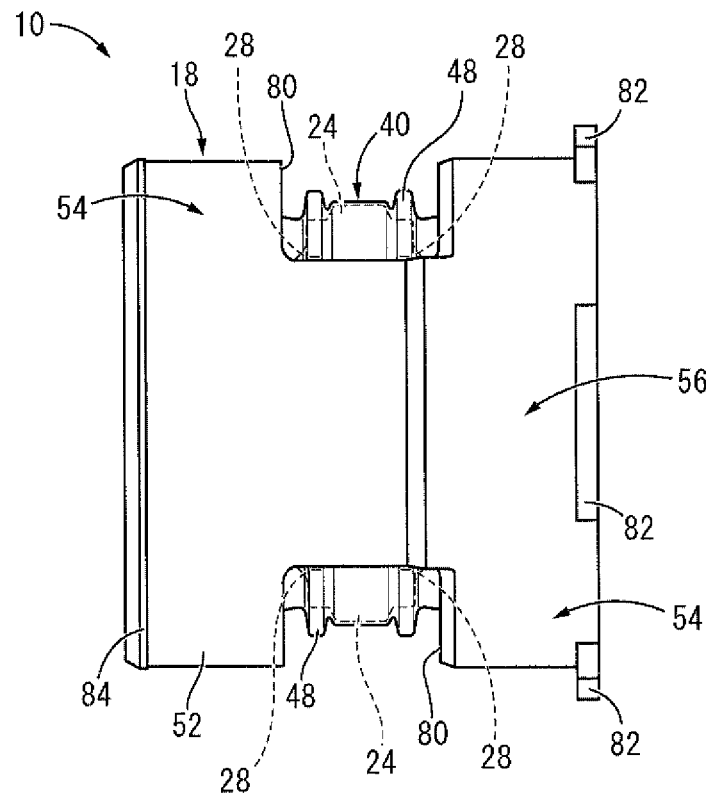
FIG. 3 is a right side view of the diff mount shown in FIG. 1.
Figure 4:
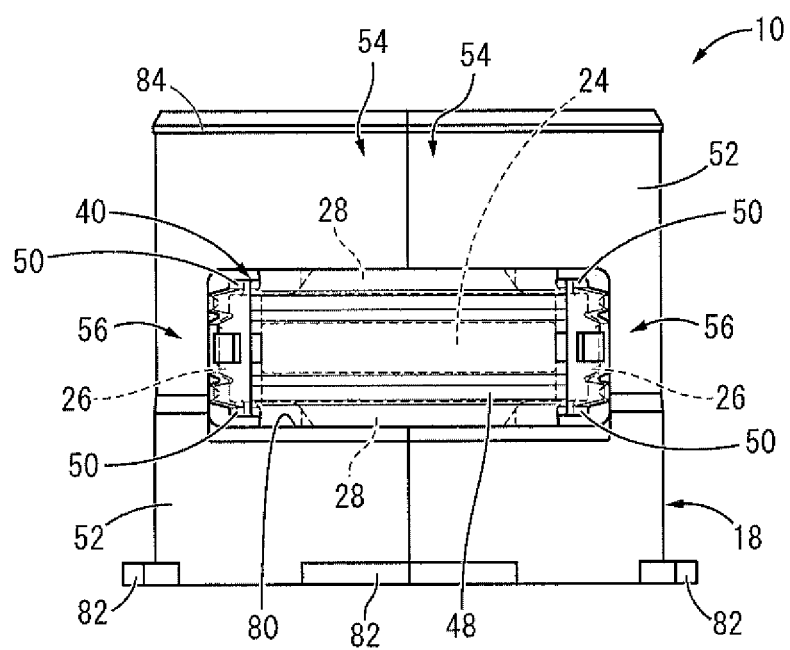
FIG. 4 is a bottom view of the diff mount shown in FIG. 1.

An embodiment of the present invention will be described in reference to the drawings as follows:

FIGS. 1 to 6 show an automobile diff mount 10 as a first embodiment of the cylindrical vibration-damping device with the structure according to the present invention. The diff mount 10 has a structure in which an inner shaft member 12 and intermediate rings 14 are elastically connected by a main rubber elastic body 16, while the inner shaft member 12 and an outer cylindrical member 18 are elastically connected by the main rubber elastic body 16 by means of externally fitting the outer cylindrical member 18 onto the intermediate rings 14. Then, the inner shaft member 12 is attached to an unillustrated differential gear, while the outer cylindrical member 18 is attached to a fitting cylinder 20 of the sub-frame, thus supporting the differential gear by the sub-frame in a vibration damping manner.

More specifically, the inner shaft member 12 is a high-rigidity member formed with iron, aluminum alloy, fiber-reinforced synthetic resin and the like in an approximate shape of a cylinder with a small diameter extending linearly as shown in FIGS. 7 to 10.

Furthermore, a stopper member 22 is installed at the middle portion of the inner shaft member 12 in the axial direction. The stopper member 22 is an annular member formed with rigid synthetic resin and the like that protrudes out in the axis-perpendicular direction at the middle portion in the axial direction of the inner shaft member 12 by having the inner shaft member 12 inserted into the central hole and fixed in position. Also, the stopper member 22 is integrally provided with first stopper protrusions 24, 24 as stopper portions that protrude out from the inner shaft member 12 in the axis-perpendicular directions opposite to each other as well as second stopper protrusions 26, 26 that protrude out in the axis-perpendicular directions opposite to each other approximately perpendicular to the directions of protrusion of the first stopper protrusions 24, 24. The first stopper protrusion 24 is made to have a larger protruding dimension than the second stopper protrusion 26, while being integrally formed with an inner peripheral fixed portion 28 that protrudes out on both sides in the axial direction with its protrusion increasing toward the inner periphery. The first and second stopper protrusions 24, 26 each have the tip of protrusion in a stepped configuration wherein the center portion in the axial direction protrudes out further than the side portions located on both sides thereof.

Figure 11:
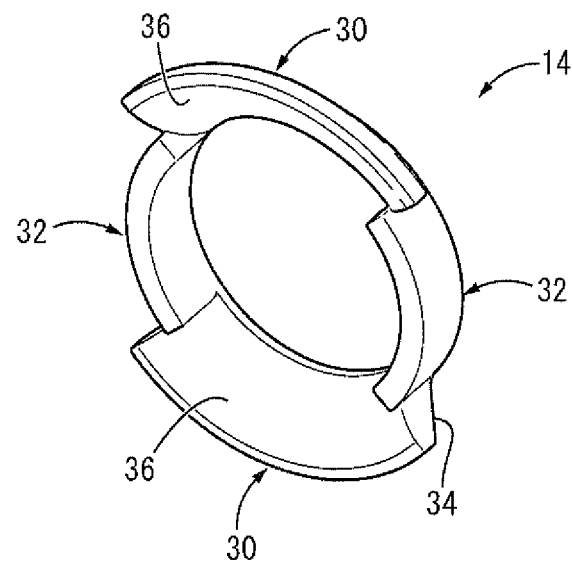
FIG. 11 is a perspective view of an intermediate ring of the diff mount shown in FIG. 1.
Figure 12:
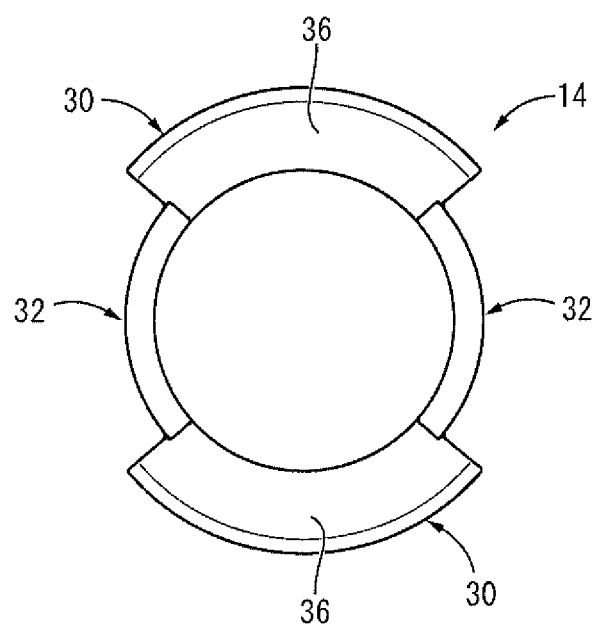
FIG. 12 is a front view of the intermediate ring shown in FIG. 11.
Figure 13:
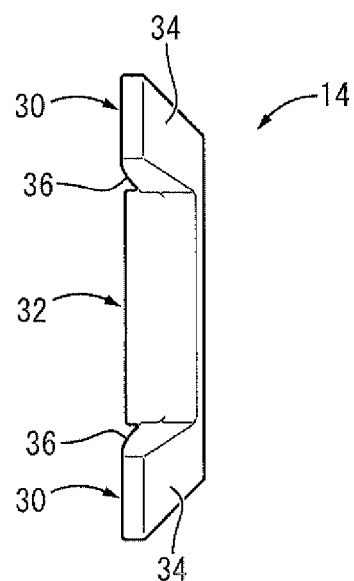
FIG. 13 is a right side view of the intermediate ring shown in FIG. 11.
Figure 14:
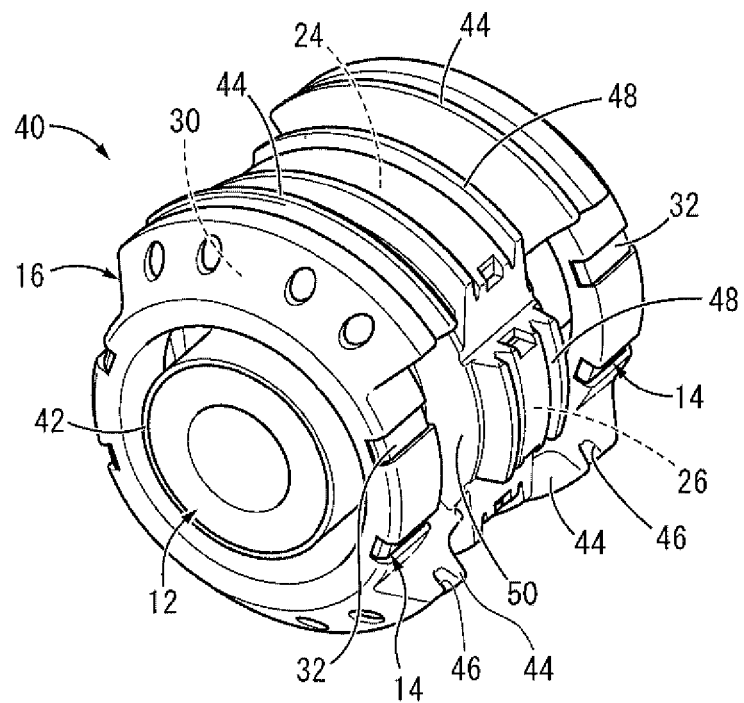
FIG. 14 is a perspective view of an integrally vulcanization molded component of a main rubber elastic body of the de diff mount shown in FIG. 1.
Figure 15:
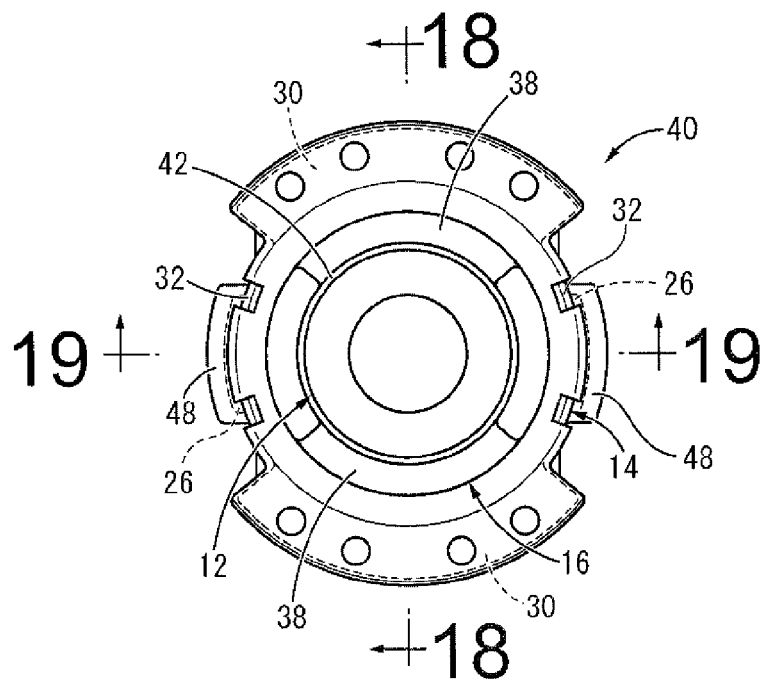
FIG. 15 is a front view of the integrally vulcanization molded component shown in FIG. 14.
Figure 16:
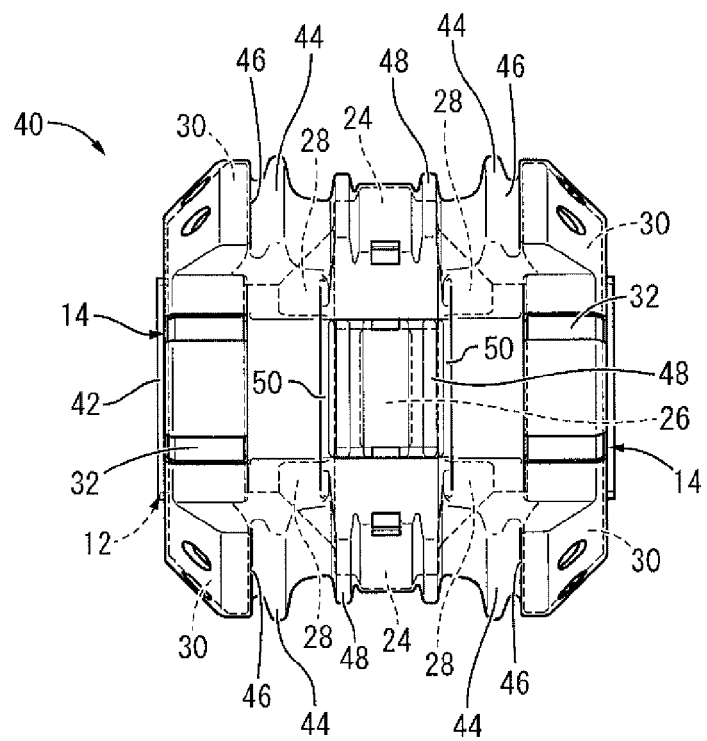
FIG. 16 is a right side view of the integrally vulcanization molded component shown in FIG. 14.
Figure 17:
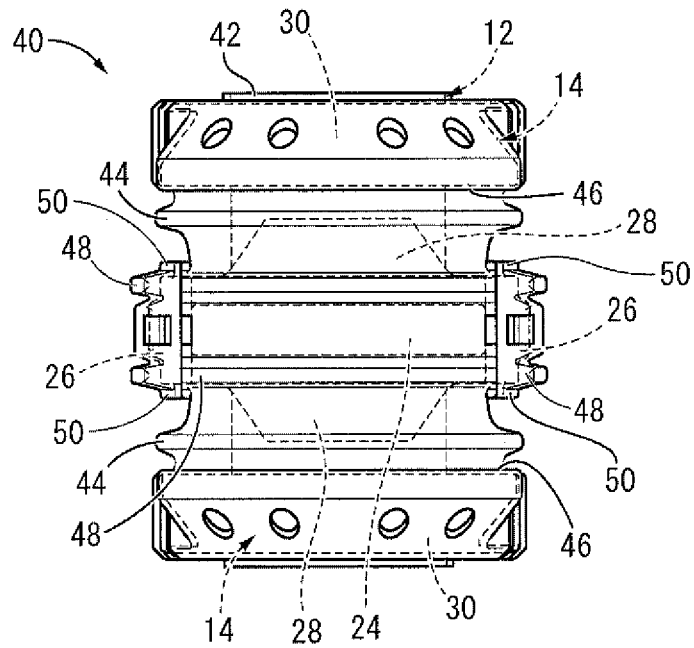
FIG. 17 is a bottom view of the integrally vulcanization molded component shown in FIG. 14.

Meanwhile, as shown in FIGS. 11 to 13, the intermediate ring 14, formed with rigid synthetic resin, is an annular member integrally provided with a pair of fixed portions 30, 30 that are arranged opposite to each other in one radial direction and a pair of connecting joints 32, 32 that connect the ends in the circumferential direction of the fixed portions 30, 30.

Figure 5:
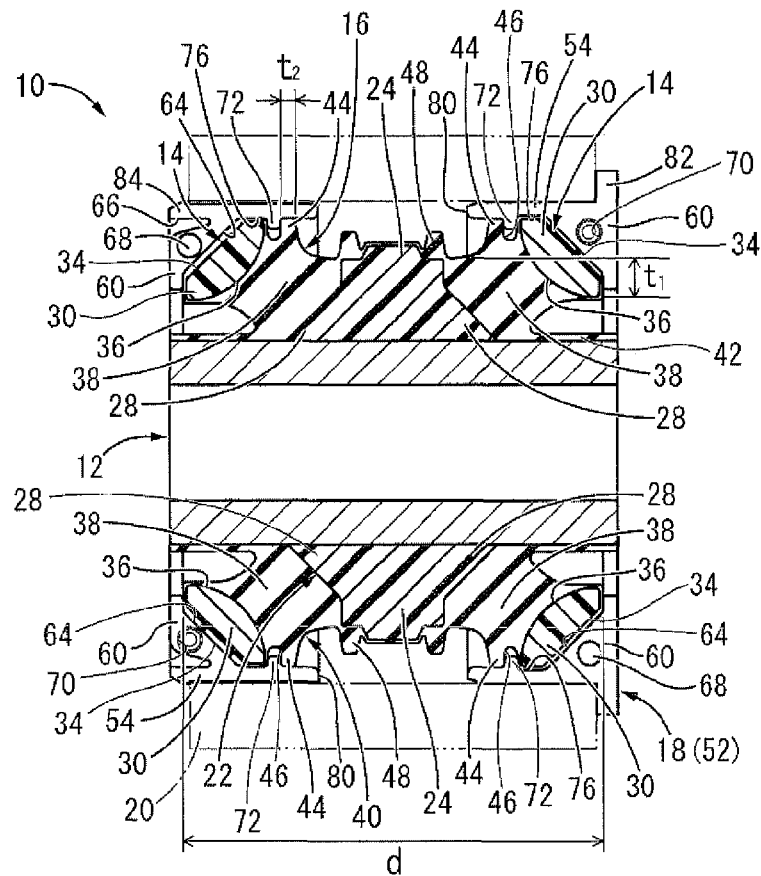
FIG. 5 is a cross sectional view taken along line 5-5 of FIG. 2.

As shown in FIG. 5, the fixed portion 30 has a sloping configuration where the diameter gradually gets smaller outward in the axial direction in the longitudinal cross section, continuing with an approximately constant cross section in a given length less than half the circumference. In addition, with the fixed portion 30, the outer edge in the axial direction of the outer peripheral surface constitutes a guiding slope 34 with the diameter decreasing outward in the axial direction, while its inner peripheral surface constitutes a sloped curvature 36 in a sloping configuration where the diameter decreases outward in the axial direction forming a convex curvature toward inside.

The connecting joint 32 is in a shape of a rectangle with one of its corners cut off diagonally in the longitudinal cross section and is integrally formed with the fixed portion 30 so as to extend outward in the circumferential direction from the outer edge in the axial direction. This allows the pair of fixed portions 30, 30 to be connected by the pair of connecting joints 32 in the circumferential direction, and the intermediate ring 14 is integrally formed continuously all around the circumference.

Then, the pair of intermediate rings 14, 14 arranged symmetrically about an axis-perpendicular plane are externally fitted onto the inner shaft member 12 and arranged respectively on both sides of the stopper member 22 in the axial direction at a given distance from the inner shaft member 12 and the stopper member 22. The inner shaft member 12 with the stopper member 22 and the pair of intermediate rings 14, 14 arranged in such a manner are elastically connected by the main rubber elastic body 16. As shown in FIG. 5, the main rubber elastic body 16 is provided with four rubber arms 38 that extend in the circumferential direction for a given length with a cross section that gradually slopes out toward the outer periphery in the axial direction. Each rubber arm 38 is formed between opposing surfaces of the inner peripheral fixed portion 28 in the first stopper protrusion 24 of the stopper member 22 and the sloped curvature 36 in the fixed portion 30 of the intermediate ring 14 and bonded by vulcanization to the first stopper protrusion 24 of the stopper member 22 and the fixed portion 30 of the intermediate ring 14. In summary, the main rubber elastic body 16 is formed as an integrally vulcanization molded component 40 provided with the inner shaft member 12, stopper member 22 and the pair of intermediate rings 14, 14. In the present embodiment, the outer peripheral surface of the inner shaft member 12 and the entire surface of the intermediate ring 14 are covered by a rubber sheath layer 42 integrally formed with the main rubber elastic body 16. Also the rubber arm 38 of the main rubber elastic body 16 extends approximately in the direction of opposition of the outer surface of the inner peripheral fixed portion 28 in the axial direction and the sloped curvature 36.

In addition, an abutting protrusion 44 protruding toward the outer periphery in the middle portion in the axial direction is integrally formed with the rubber arm 38. The abutting protrusion 44 is formed to protrude at a location axially inside the intermediate ring 14 covered by the rubber sheath layer 42 at a given distance therefrom, and a peripheral fitting groove 46 is formed between the intermediate ring 14 and the abutting protrusion 44 in the axial direction extending in the circumferential direction opening to the outer peripheral surface of the rubber arm 38.

Furthermore, an outer peripheral rubber stopper 48 is fixed to each protruding tip of the first and second stopper protrusions 24, 26, while an axial-direction rubber stopper 50 is fixed on both sides in the axial direction of the second stopper protrusion 26, and both the outer peripheral rubber stopper 48 and the axial-direction rubber stopper 50 are integrally formed with the main rubber elastic body 16. The outer peripheral rubber stopper 48 is made thicker at the portions fixed to both ends in the axial direction of the protruding tip of the first stopper protrusion 24 than the portion fixed to the center in the axial direction, and both ends of the outer peripheral rubber stopper 48 in the axial direction reach closer to the outer periphery than the center portion in the axial direction. In addition, between the central portion and both ends of the outer peripheral rubber stopper 48 in the axial direction, a groove in an approximately V-shape is formed opening to the outer peripheral surface, which allows enough swelling deformation in the axial direction resulting from the compressive deformation of the outer peripheral rubber stopper 48 in the radial direction.

Figure 20:
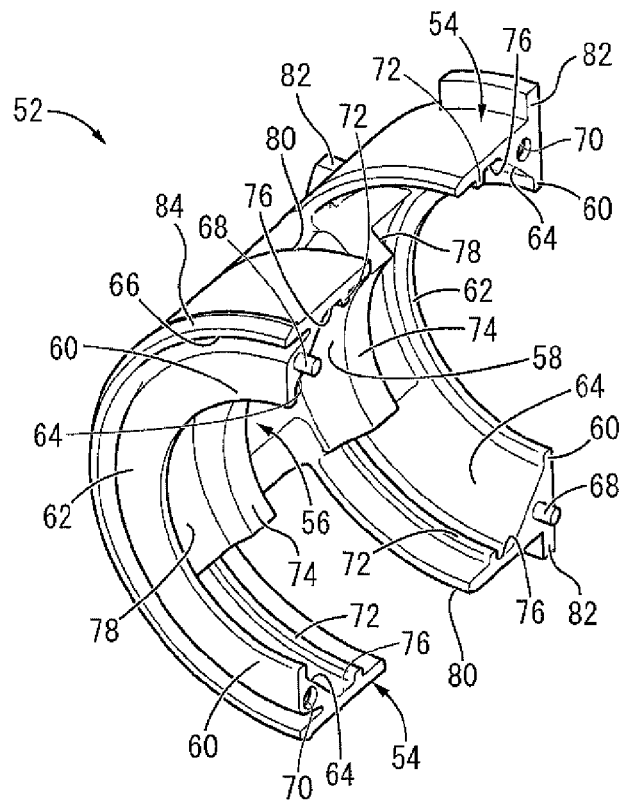
FIG. 20 is a perspective view of a half-split cylinder of an outer cylindrical member of the diff mount shown in FIG. 1.

With the integrally vulcanization molded component 40 of the main rubber elastic body 16 having the structure described above, the outer cylindrical member 18 is attached to the intermediate rings 14, 14. As shown in FIGS. 1 to 6, the outer cylindrical member 18 is a high-rigidity member formed with metals such as iron, aluminum alloy, or rigid synthetic resin and the like in an approximate shape of a cylinder as a whole. Also, the outer cylindrical member 18 has a configuration of two divided sections combining a pair of half-split cylinders 52, 52 (see FIG. 20). In the present embodiment, the pair of half-split cylinders 52, 52 are made identical in shape to each other, and the outer cylindrical member 18 is constituted by combining these identical half-split cylinders 52, 52 to face each other.

More specifically, the half-split cylinder 52 has an outer peripheral surface with an approximately constant curvature radius, and the both ends in the circumferential direction constitute a thin cylindrical portion 54 with a larger inner radius, while the central portion in the circumferential direction constitutes a thick cylindrical portion 56 with a smaller inner radius. In the center of the thick cylindrical portion 56 in the axial direction, a groove-shaped portion 58 is formed to open toward the inner periphery, and the inner radius thereof is made partially larger than that of other portions. Also, at both ends of the half-split cylinder 52 in the circumferential direction, a cutout is formed at the center in the axial direction opening to the circumferential end surface to penetrate through the cylinder in the radial direction.

Under these circumstances, at the axial end of the half-split cylinder 52, first outer regulating protrusions 60, 60 are integrally formed as regulating protrusions protruding inward in the radial direction in the thin cylindrical portion 54, while second outer regulating protrusions 62, 62 are integrally formed as regulating protrusions protruding inward in the radial direction in the thick cylindrical portion 56.

The first outer regulating protrusion 60 extends in the circumferential direction with an approximately constant cross section and, as shown in FIG. 5, is integrally provided with the base portion that gradually narrows down in the axial direction toward the tip as well as the tip portion that protrudes from the base portion toward the inner periphery with an approximately constant width in the axial direction. More specifically, with the base portion of the first outer regulating protrusion 60, its outer surface in the axial direction constitutes a plane extending in approximately the axis-perpendicular direction, while its inner surface in the axial direction constitutes a holding slope 64 that gradually slopes outward in the axial direction as it goes toward the inner periphery. At one end (left side in FIG. 5) of the half-split cylinder 52, a deformation allowing groove 66 is formed all around the circumference opening outward in the axial direction, which is formed in the base portion of the first outer regulating protrusion 60 at the thin cylindrical portion 54. Also, in the base portion of the first outer regulating protrusion 60, either a fitting protrusion 68 in the shape of circular cylinder that protrudes outward in the circumferential direction or a fitting hole 70 that opens to the end surface in the circumferential direction with a cross section corresponding to the fitting protrusion 68 is formed.

Figure 6:
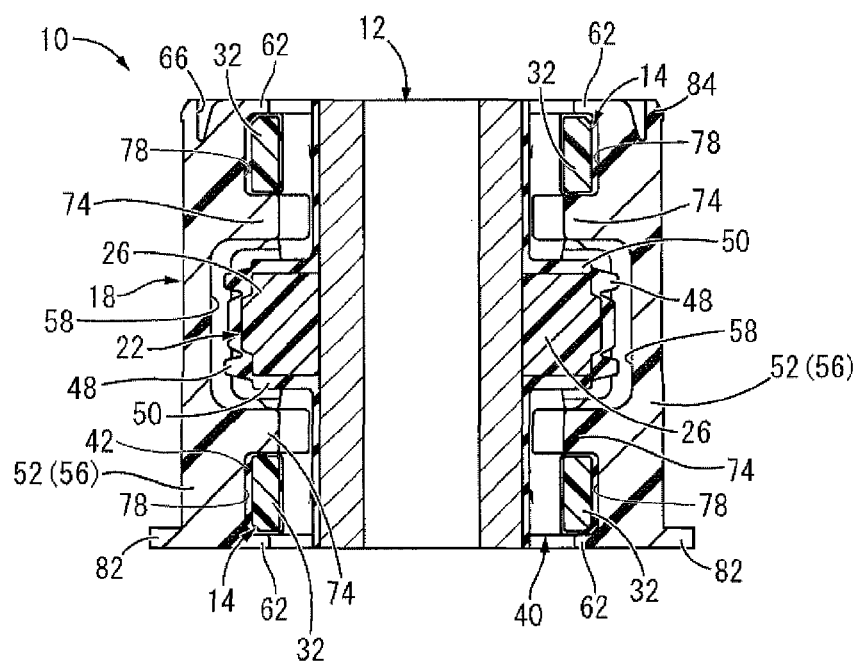
FIG. 6 is a cross sectional view taken along line 6-6 of FIG. 2.
Figure 7:
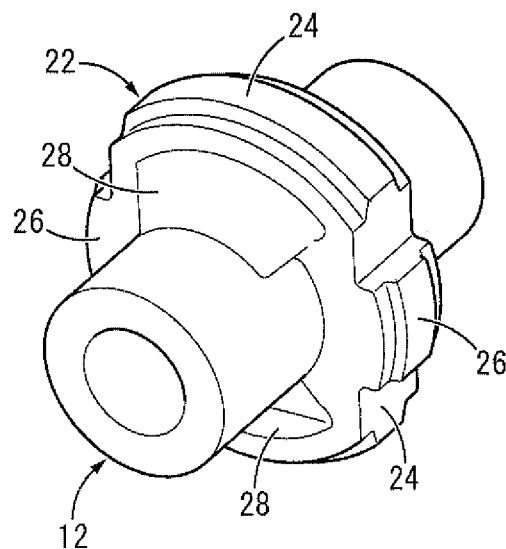
FIG. 7 is a perspective view of an inner shaft member with a stopper portion of the diff mount shown in FIG. 1.
Figure 8:
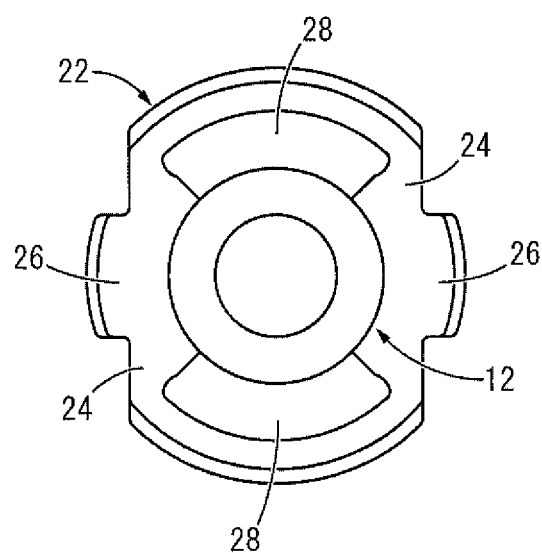
FIG. 8 is a front view of the inner shaft member with the stopper portion shown in FIG. 7.
Figure 9:
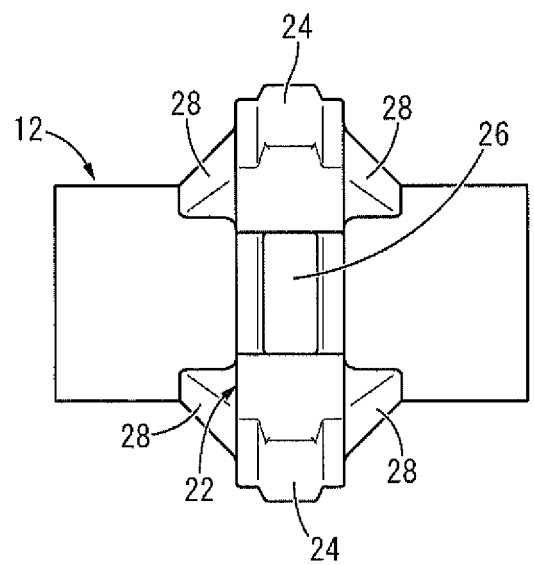
FIG. 9 is a right side view of the inner shaft member with the stopper portion shown in FIG. 7.
Figure 10:
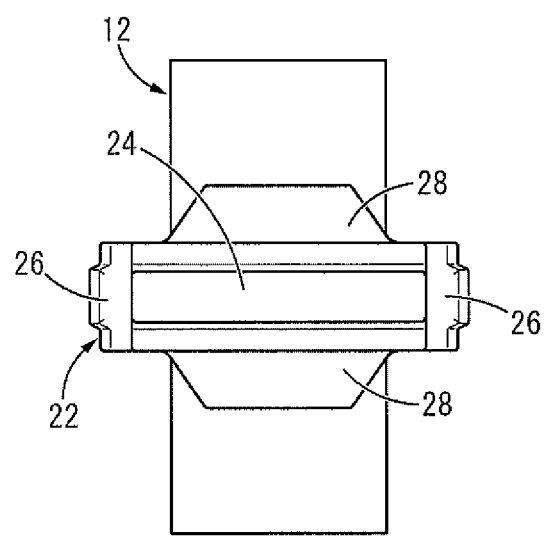
FIG. 10 is a bottom view of the inner shaft member with the stopper portion shown in FIG. 7.

The second outer regulating protrusion 62 extends in the circumferential direction with approximately a constant cross section, and as shown in FIG. 6, is integrally provided with the base portion that narrows down in the axial direction toward the tip as well as the tip portion that protrudes from the base portion toward the inner periphery with an approximately constant width in the axial direction.

Meanwhile, in the middle portion in the axial direction of the half-split cylinder 52, first inner regulating protrusions 72, 72 are integrally formed as regulating protrusions protruding inward in the radial direction in the thin cylindrical portion 54, while second inner regulating protrusions 74, 74 are integrally formed as regulating protrusions protruding inward in the radial direction in the thick cylindrical portion 56.

The first inner regulating protrusion 72 extends in the circumferential direction with a cross section with an approximately constant width in the axial direction and protrudes toward the inner periphery with a shorter protrusion than the first outer regulating protrusion 60. The pair of first inner regulating protrusions 72, 72 are provided at locations inward in the axial direction away by a given distance from the respective first outer regulating protrusions 60, 60 located on both sides in the axial direction, and a first fitting groove 76 is formed between the first outer regulating protrusion 60 and the first inner regulating protrusion 72 in the axial direction as a fitting groove that opens toward the inner periphery and extends in the circumferential direction.

The second inner regulating protrusion 74 extends in the circumferential direction with an approximately constant cross section with almost the same or a longer protrusion than the second outer regulating protrusion 62 and a larger width in the axial direction than the second outer regulating protrusion 62, protruding toward the inner periphery of the outer cylindrical member 18. The pair of second inner regulating protrusions 74, 74 are provided at locations inward in the axial direction away by a given distance from the respective second outer regulating protrusions 62, 62 located on both sides in the axial direction, and a second fitting groove 78 is formed between the second outer regulating protrusion 62 and the second inner regulating protrusion 74 in the axial direction as a fitting groove that opens toward the inner periphery and extends in the circumferential direction. The second inner regulating protrusions 74, 74 are formed on both sides in the axial direction across the groove-shaped portion 58.

The width of the second inner regulating protrusion 74 in the axial direction is made larger than that of the first inner regulating protrusion 72, and the second inner regulating protrusion 74 is given larger deformation rigidity than the first inner regulating protrusion 72. Also, the length of protrusion inward in the radial direction of the second inner regulating protrusion 74 is made larger than that of the first inner regulating protrusion 72, and the abutment area of the second inner regulating protrusion 74 against the connecting joint 32, which will be described later, is made larger than the abutment area of the first inner regulating protrusion 72 against the fixed portion 30, which will also be described later.

The half-split cylinder 52 with the structure described above is combined in pair with the end surfaces in the circumferential direction overlapped with each other, and the pair of half-split cylinders 52, 52 are fixed to each other by having the fitting protrusion 68 provided at the tip in the circumferential direction inserted into the fitting hole 70 to constitute the outer cylindrical member 18. By means of combination of the pair of half-split cylinders 52, 52, the circumferential end of the cutout of each half-split cylinder 52 is connected to the other to form a pair of window portions 80, 80 that penetrate through the cylinder in the radial direction.

Then, the outer cylindrical member 18 is externally fitted onto the integrally vulcanization molded component 40 of the main rubber elastic body 16. In other words, by combining the pair of half-split cylinders 52, 52 to sandwich the integrally vulcanization molded component 40 from both sides in the radial direction to be fixed to each other, the pair of intermediate rings 14, 14 are held between the pair of half-split cylinders 52, 52 in the radial direction so that the outer cylindrical member 18 is externally fitted onto the integrally vulcanization molded component 40 in a non-adhesive manner so as to cover the outer peripheral surface. Thus, the diff mount 10 of the present embodiment is constituted by having the outer cylindrical member 18 externally fitted onto the integrally vulcanization molded component 40 of the main rubber elastic body 16 in this way.

Under these circumstances, the intermediate ring 14 that constitutes the integrally vulcanization molded component 40 has the pair of fixed portions 30, 30 fitted in the first fitting groove 76, so that the first outer regulating protrusion 60 is arranged outside each fixed portion 30 in the axial direction, while the first inner regulating protrusion 72 is arranged inside each fixed portion 30 in the axial direction. In addition, the intermediate ring 14 has the pair of connecting joints 32, 32 fitted in the second fitting groove 78, so that the second outer regulating protrusion 62 is arranged outside each connecting joint 32 in the axial direction, while the second inner regulating protrusion 74 is arranged inside each connecting joint 32 in the axial direction.

Then, relative displacement of the intermediate ring 14 outward in the axial direction with respect to the outer cylindrical member 18 is regulated by the abutment against the first and second outer regulating protrusions 60, 62, while relative displacement of the same inward in the axial direction is regulated by the first and second inner regulating protrusions 72, 74. This constitutes the positioning member for positioning the intermediate ring 14 with respect to the outer cylindrical member 18 in the axial direction by means of the abutment of the first and second outer regulating protrusions 60, 62 and the first and second inner regulating protrusions 72, 74 against the intermediate ring 14. In the present embodiment, the first and second outer regulating protrusions 60, 62 are abutted in advance against the outer surface of the intermediate ring 14 in the axial direction, while the first and second inner regulating protrusions 72, 74 are abutted in advance against the inner surface of the intermediate ring 14 in the axial direction so that the intermediate ring 14 is positioned fixedly with respect to the outer cylindrical member 18 in the axial direction.

According to the structure described above, relative displacement of the intermediate ring 14 outward in the axial direction with respect to the outer cylindrical member 18 is regulated by the first and second outer regulating protrusions 60, 62, while relative displacement of the intermediate ring 14 inward in the axial direction with respect to the outer cylindrical member 18 is regulated by the first and second inner regulating protrusions 72, 74 so that the intermediate ring 14 is positioned in the axial direction with respect to the outer cylindrical member 18 in a non-adhesive manner. Therefore, the elastic deformation of the main rubber elastic body 16 is efficiently triggered against the vibration input in the axial direction so as to effectively exert the vibration damping effect based on the internal friction and the like of the main rubber elastic body 16. In the present embodiment, between the fixed portion 30 of the intermediate ring 14 and the first stopper protrusion 24 of the stopper member 22 in the axial direction, the main rubber elastic body 16 runs continuously in the axial direction within a given range of width $t_1$ (see FIG. 5) in the radial direction, thus achieving a high dynamic spring constant against compression in the axial direction.

Figure 18:
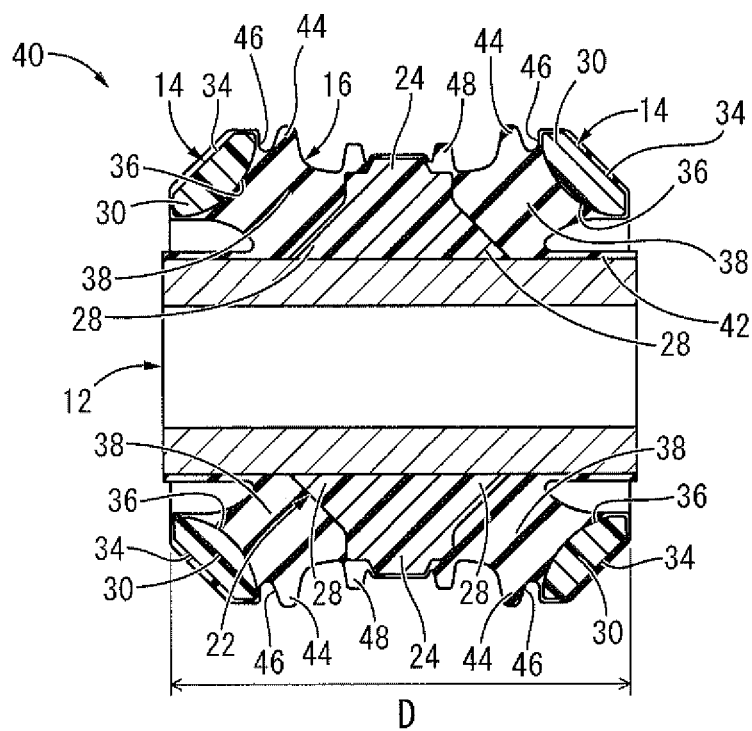
FIG. 18 is a cross sectional view taken along line 18-18 of FIG. 15.
Figure 19:
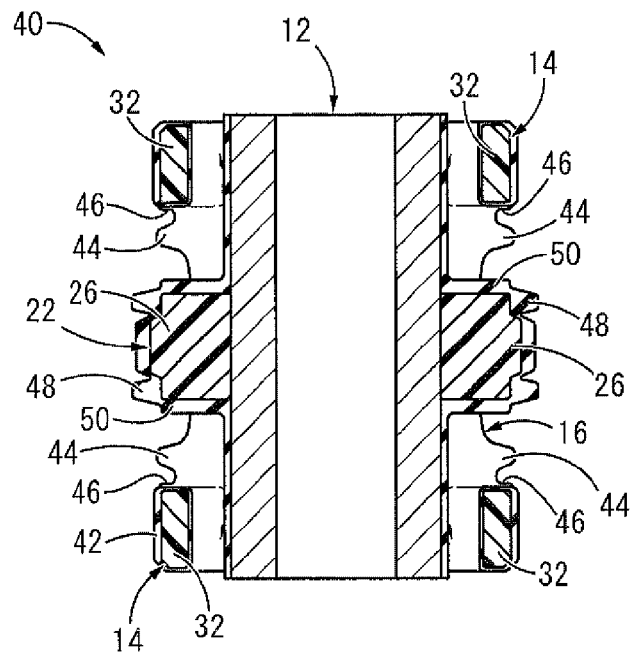
FIG. 19 is a cross sectional view taken along line 19-19 of FIG. 15.

Also in the present embodiment, pre-compression is applied to the main rubber elastic body 16 in the axial direction by externally fitting the outer cylindrical member 18 onto the integrally vulcanization molded component 40. In other words, the maximum distance D (see FIG. 18) between the outer surfaces of the pair of intermediate rings 14, 14 in the axial direction covered by the rubber sheath layer 42 in the integrally vulcanization molded component 40 in a single form is made larger than the distance d (see FIG. 5) between the opposing protrusion end surfaces of the pair of first outer regulating protrusions 60, 60 (distance between the opposing protrusion end surfaces of the pair of second outer regulating protrusions 62, 62) in the axial direction. Then, once the pair of half-split cylinders 52, 52 are assembled sandwiching from both sides the integrally vulcanization molded component 40 provided with the pair of intermediate rings 14, 14, the pair of intermediate rings 14, 14 are displaced to get closer to each other in the axial direction by the inward pressure of the first outer regulating protrusion 60 in the radial direction against the guiding slope 34 provided on the outer peripheral surface of the fixed portion 30 in each intermediate ring 14, thereby causing compressive deformation of the main rubber elastic body 16 in the axial direction. In the same token, forces are applied to the pair of intermediate rings 14, 14 to move closer to each other in the axial direction by the second outer regulating protrusion 62 abutting against the slope provided on the outer peripheral surface of the connecting joint 32, thereby causing compressive deformation of the main rubber elastic body 16 in the axial direction. Consequent to these actions, pre-compression is applied to the main rubber elastic body 16 in the axial direction, thus improving the durability of the main rubber elastic body 16, especially against the tensile force acting in the axial direction.

Under the condition where the outer cylindrical member 18 is installed to the integrally vulcanization molded component 40, the guiding slope 34 of the intermediate ring 14 is pressed against the holding slope 64 provided at the base portion of the first outer regulating protrusion 60 based on the elasticity of the main rubber elastic body 16. This allows the guiding action by the abutment between these slopes 34, 64 to be exerted to easily hold the intermediate ring 14 at a given relative position with respect to the outer cylindrical member 18. Especially in the present embodiment, since the surface of the intermediate ring 14 is covered by the rubber sheath layer 42, the tolerance of the part is absorbed by deformation of the rubber sheath layer 42, thus exerting the guiding action in a stable manner. Also, in the present embodiment, the holding slope 64 is made in a configuration that nearly corresponds to the guiding slope 34, resulting in a tight abutment with no gap.

Also, the abutting protrusion 44 of the main rubber elastic body 16 is abutted against the outer cylindrical member 18 inside the first inner regulating protrusion 72 in the axial direction for a given width $t_2$ (see FIG. 5) in a non-adhesive manner. This allows the main rubber elastic body 16 to be arranged at the formation of the abutting protrusion 44 continuously between the opposing surfaces of the inner shaft member 12 provided with the stopper member 22 and the outer cylindrical member 18 in the radial direction, and a rubber elastic body is filled in the space between the inner shaft member 12 and the outer cylindrical member 18 in the radial direction. In the present embodiment, the abutting protrusion 44 of the integrally vulcanization molded component 40 before the installation of the outer cylindrical member 18 protrudes toward the outer periphery beyond the intermediate ring 14, and the abutting protrusion 44 is compressed in the radial direction by the installation of the outer cylindrical member 18 to the integrally vulcanization molded component 40. Also, the first inner regulating protrusion 72 of the outer cylindrical member 18 is fitted in the peripheral fitting groove 46 and the outer surface of the abutting protrusion 44 in the axial direction is abutted against the first inner regulating protrusion 72.

Therefore, when a compression force in the radial direction is applied to the main rubber elastic body 16 by the load input in the axis-perpendicular direction, the main rubber elastic body 16 efficiently undergoes a compressive deformation especially at the abutment portion of the abutting protrusion 44, thus effectively exerting the intended vibration damping effect. Moreover, since the abutting protrusion 44 is pre-compressed in the radial direction developing a stiff spring effect, the rolling displacement and the like of the differential gear is effectively controlled. In addition, since tilting outward in the axial direction of the abutting protrusion 44 is regulated by the first inner regulating protrusion 72, the intended spring characteristics are achieved in a stable manner in response to the load input in the axis-perpendicular direction.

Furthermore, once a tensile force is applied to the main rubber elastic body 16 in the radial direction due to the load input in the axis-perpendicular direction, the abutting protrusion 44 abutted against the outer cylindrical member 18 in a non-adhesive manner moves inward in the radial direction away from the outer cylindrical member 18 so that the tensile stress acting on the main rubber elastic body 16 is reduced. As described above, improved durability of the main rubber elastic body 16 can be achieved while favorably exerting the vibration damping effect resulting from elastic deformation of the main rubber elastic body 16.

Also, the stopper member 22 has the first stopper protrusion 24 aligned with the window portion 80 of the outer cylindrical member 18, and the window portion 80 is formed on the outer cylindrical member 18 at a location opposing the first stopper protrusion 24 in the radial direction. In addition, the second stopper protrusion 26 is inserted in the groove-shaped portion 58 between the pair of second inner regulating protrusions 74, 74 in the axial direction. Then, under the condition of being mounted onboard, the first stopper protrusion 24 is arranged inside in the radial direction at a given distance from the fitting cylinder 20 of the sub-frame, and the first axis-perpendicular stopper means that regulates relative displacement between the inner shaft member 12 and the outer cylindrical member 18 in one radial direction (up-down direction in FIG. 5) is constituted by the abutment of the first stopper protrusion 24 against the fitting cylinder 20. In addition, the second stopper protrusion 26 is arranged inside in the radial direction at a given distance from the outer peripheral base wall of the groove-shaped portion 58 of the outer cylindrical member 18, and the second axis-perpendicular stopper means that regulates relative displacement between the inner shaft member 12 and the outer cylindrical member 18 in another radial direction (left-right direction in FIG. 6) is constituted by the abutment of the second stopper protrusion 26 against the outer cylindrical member 18. Furthermore, the second stopper protrusion 26 is arranged inside in the axial direction at a given distance from the side wall in the axial direction of the groove-shaped portion 58, and the axial stopper means that regulates relative displacement between the inner shaft member 12 and the outer cylindrical member 18 in both axial directions is constituted by the abutment of the second stopper protrusion 26 against the outer cylindrical member 18.

This enables to make the length of protrusion of the first stopper protrusion 24 in the radial direction larger than that of the second stopper protrusion 26 in the radial direction while keeping a proper stopper clearance of the first and second axis-perpendicular stopper means. Therefore, the area of overlap in projection in the axial direction between the fixed portion 30 of the intermediate ring 14 where the main rubber elastic body 16 is fixed and the first stopper protrusion 24 is maintained large enough. For this reason, with the main rubber elastic body 16, the width $t_1$ of the portion between the fixed portion 30 and the first stopper protrusion 24 continuing in the axial direction can be made large enough, thus exhibiting stiff spring characteristics in the axial direction.

The diff mount 10 has the inner shaft member 12 fixed to the differential gear using unillustrated fixing bolts, while having the outer cylindrical member 18 fixed thereto by fitting in the fitting cylinder 20 provided on the sub-frame. The outer cylindrical member 18 of the present embodiment has a plurality of flange-shaped portions 82 at one end in the axial direction (right end in FIG. 5) provided intermittently along the circumference protruding toward the outer periphery, while having a locking hook 84 provided at the other end in the axial direction (left end in FIG. 5) protruding slightly beyond the middle portion of the outer cylindrical member 18 toward the outer periphery. This locking hook 84 has its diameter gradually reducing outward in the axial direction, and the fitting cylinder 20 is held between the flange-shaped portion 82 and the locking hook 84 by the insertion of the outer cylindrical member 18 into the fitting cylinder 20 from outside of the locking hook 84 in the axial direction, thus allowing the outer cylindrical member 18 to be positioned with respect to the fitting cylinder 20 in the axial direction. Especially in the present embodiment, since the deformation rigidity is reduced by providing the deformation allowing groove 66 on the inner peripheral side of the formation part of the locking hook 84 in the outer cylindrical member 18, insertion of the outer cylindrical member 18 into the fitting cylinder 20 is made easier.

An embodiment of the present invention has been described in detail above, but the present invention is not limited by those specific descriptions. For example, the intermediate ring 14 does not have to be abutted in advance against the first outer and inner regulating protrusions 60, 72, or the second outer and inner regulating protrusions 62, 74 in the axial direction, and relative displacement of the intermediate ring 14 with respect to the outer cylindrical member 18 may be allowed to some extent.

Also, as shown in the above-described embodiment, the pair of intermediate rings are preferably arranged in approximately the same shape in symmetry about a plane, but can be arranged in different shapes in pursuit of achieving even better vibration damping performance.

Also, the intermediate ring can be formed with a constant cross-section all around the circumference, and for example, a structure can be adopted where the same cross-sectional shape of the fixed portion 30 in the above-described embodiment continues all around the circumference. In addition, in the above-described embodiment, the first outer and inner regulating protrusions 60, 72 and the second outer and inner regulating protrusions 62, 74 with different cross-sectional shapes are provided in sequence along the circumference as the cross-sectional shape of the intermediate ring changes. However, in case of adopting the above-mentioned intermediate ring with a constant cross section, the first outer and inner regulating protrusions 60, 72, for example, can be provided all around the circumference.

Also, it is not essential that the inner peripheral surface of the intermediate ring 14 be made a convex curvature (the sloped curvature 36) toward the main rubber elastic body 16 in the longitudinal cross section, but it can also be a linear tapered surface in the longitudinal cross section, for example, as is the case with the guiding slope 34 of the above-described embodiment.

Also, the regulating protrusion does not have to extend continuously in the circumferential direction, but it can be a column or the like, for example, that protrudes inward in the radial direction. In case of adopting such a regulating protrusion in a columnar shape, it is desirable to provide a plurality of regulating protrusions along the circumference in order to keep a balance between the intermediate ring and the regulating protrusion in abutment against each other.

Also, the specific configuration of the main rubber elastic body is not particularly limited, and for example, the abutting protrusion 44 can be omitted.

Also, in the above-described embodiment, pre-compression forces both in axial and axis-perpendicular directions are applied to the main rubber elastic body 16 by the installation of the outer cylindrical member 18, but these pre-compression forces against the main rubber elastic body 16 are not essential. Depending on the required characteristics and the assumed input load, another structure can be adopted where the main rubber elastic body 16 is not pre-compressed at the time of installation of the outer cylindrical member 18.

Also, the pair of window portions 80, 80 that penetrate through the cylinder were formed on the outer cylindrical member 18 of the above-described embodiment, but these window portions are not essential. Improvements to the deformation rigidity of the outer cylindrical member and the resultant high dynamic spring constant can be obtained by omitting the window portions.

Also, the stopper portion may have a constant cross sectional shape all around the circumference, and its specific configuration is not particularly limited.

The present invention is not only applied to a diff mount, but can also be applied to a cylindrical vibration-damping device used for engine mounts, sub-frame mounts, body mounts or the like. In addition, the scope of application of the present invention is not limited to vibration damping devices for motor vehicles but can be favorably adopted for cylindrical vibration-damping devices used for motor cycles, railroad vehicles, and industrial vehicles.

What is claimed is:

1. A cylindrical vibration-damping device comprising:
an inner shaft member having a stopper portion protruding in an axis-perpendicular direction from a middle portion in an axial direction thereof;
a pair of intermediate rings extending in a circumferential direction around the inner shaft member while being arranged respectively on both sides across the stopper portion in the axial direction;
a main rubber elastic body elastically connecting the stopper portion and the intermediate rings; and
an outer cylindrical member externally fitted onto the intermediate rings,
wherein the outer cylindrical member is made in a configuration of two sections divided along an circumference, the outer cylindrical member being externally fitted onto the intermediate rings in a non-adhesive manner by means of having the intermediate rings sandwiched by the outer cylindrical member in a radial direction, and
wherein a plurality of regulating protrusions protruding inward in the radial direction are formed on the outer cylindrical member at a given distance and arranged on both sides of the intermediate rings in the axial direction so as to provide a positioning member that positions the intermediate rings with respect to the outer cylindrical member in the axial direction by means of abutting the intermediate rings against the regulating protrusions in the axial direction.

2. The cylindrical vibration-damping device according to claim 1, wherein an outer peripheral surface of the intermediate ring is provided with a guiding slope whose diameter decreases outward in the axial direction, while an inner surface in the axial direction of the regulating protrusion located outside the intermediate ring in the axial direction constitutes a holding slope corresponding to the guiding slope.

3. The cylindrical vibration-damping device according to claim 2, wherein by means of having the pair of intermediate rings sandwiched in the radial direction between the outer cylindrical member divided into two sections in such a way that the guiding slope of each intermediate ring is pressed by the outer cylindrical member, the pair of intermediate rings are displaced closer to each other in the axial direction so as to apply pre-compression to the main rubber elastic body in the axial direction.

4. The cylindrical vibration-damping device according to claim 1, wherein the plurality of regulating protrusions extend in the circumferential direction and the intermediate rings are fitted in fitting grooves formed between the regulating protrusions in the axial direction.

5. The cylindrical vibration-damping device according to claim 1, wherein the intermediate ring is provided with a pair of fixed portions facing each other in one radial direction, and the pair of fixed portions and the stopper portion are elastically connected to each other by the main rubber elastic body, while the intermediate ring is provided with a pair of connecting joints that connect ends of the pair of fixed portions in the circumferential direction, and the regulating protrusions are arranged on both sides of the pair of connecting joints in the axial direction.

6. The cylindrical vibration-damping device according to claim 5, wherein the regulating protrusions are arranged on both sides in the axial direction of the pair of fixed portions as well as on both sides in the axial direction of the pair of connecting joints, while a protrusion height inward in the radial direction of the regulating protrusion arranged inside the pair of fixed portions in the axial direction is made smaller than that of the regulating protrusion arranged inside the pair of connecting joints in the axial direction.

7. The cylindrical vibration-damping device according to claim 1, wherein a window portion is formed penetrating through a portion of the outer cylindrical member opposing the stopper portion in the axis-perpendicular direction.

8. The cylindrical vibration-damping device according to claim 1, wherein the main rubber elastic body is abutted against the outer cylindrical member inside the intermediate ring in the axial direction in a non-adhesive manner, while the main rubber elastic body is provided continuously in the axis-perpendicular direction between the inner axial member and the outer cylindrical member at a section abutting against the outer cylindrical member.

9. The cylindrical vibration-damping device according to claim 1, wherein an inner peripheral surface of the intermediate ring, where the main rubber elastic body is bonded, constitutes a sloped curvature that is convex in a longitudinal cross section toward the main rubber elastic body.

* * * * *